United States Patent
Dang et al.

(10) Patent No.: US 11,915,123 B2
(45) Date of Patent: Feb. 27, 2024

(54) FUSING MULTIMODAL DATA USING RECURRENT NEURAL NETWORKS

(71) Applicant: International Business Machines Corporation, Armonk, NY (US)

(72) Inventors: Xuan-Hong Dang, Chappaqua, NY (US); Syed Yousaf Shah, Yorktown Heights, NY (US); Petros Zerfos, New York, NY (US); Nancy Anne Greco, Lagrangeville, NY (US)

(73) Assignee: International Business Machines Corporation, Armonk, NY (US)

( * ) Notice: Subject to any disclaimer, the term of this patent is extended or adjusted under 35 U.S.C. 154(b) by 651 days.

(21) Appl. No.: 16/683,649

(22) Filed: Nov. 14, 2019

(65) Prior Publication Data

US 2021/0150315 A1 May 20, 2021

(51) Int. Cl.
*G06F 40/30* (2020.01)
*G06F 3/08* (2006.01)
(Continued)

(52) U.S. Cl.
CPC ............ *G06N 3/047* (2023.01); *G06F 17/16* (2013.01); *G06F 17/18* (2013.01); *G06F 40/30* (2020.01); *G06N 20/00* (2019.01)

(58) Field of Classification Search
CPC .... G06F 40/211; G06F 40/253; G06F 40/268; G06F 40/284; G06F 40/30; G06N 20/00; G06Q 30/00; G10L 15/00
See application file for complete search history.

(56) References Cited

U.S. PATENT DOCUMENTS 6,415,268 B1    7/2002   Korisch
6,532,449 B1    3/2003   Goertzel et al.
(Continued)

FOREIGN PATENT DOCUMENTS

CN     108229662     6/2018
CN     108805087 A   11/2018
(Continued)

OTHER PUBLICATIONS

Title={Multimodal deep learning for short-term stock volatility prediction}, author={Sardelich, Marcelo and Manandhar, Suresh}, journal={arXiv preprint arXiv:1812.10479}, year={2018}, pp. 1-40. (Year: 2018).*

(Continued)

*Primary Examiner* — Lamont M Spooner
(74) *Attorney, Agent, or Firm* — Jordan T. Schiller

(57) ABSTRACT

Embodiments relate to a system, program product, and method for employing deep learning techniques to fuse data across modalities. A multi-modal data set is received, including a first data set having a first modality and a second data set having a second modality, with the second modality being different from the first modality. The first and second data sets are processed, including encoding the first data set into one or more first vectors, and encoding the second data set into one or more second vectors. The processed multimodal data set is analyzed, and the encoded features from the first and second modalities are iteratively and asynchronously fused. The fused modalities include combined vectors from the first and second data sets representing correlated temporal behavior. The fused vectors are then returned as output data.

24 Claims, 9 Drawing Sheets

(51) Int. Cl.
*G06F 17/16* (2006.01)
*G06F 17/18* (2006.01)
*G06N 3/047* (2023.01)
*G06N 20/00* (2019.01)

(56) References Cited

U.S. PATENT DOCUMENTS

| | | | |
|---|---|---|---|
| 6,745,150 B1 | 6/2004 | Breiman | |
| 8,285,619 B2 | 10/2012 | Herz et al. | |
| 9,892,745 B2* | 2/2018 | Dimitriadis | G10L 25/84 |
| 10,185,996 B2 | 1/2019 | Lee et al. | |
| 10,223,586 B1* | 3/2019 | Leibovitz | G06V 30/416 |
| 10,303,768 B2 | 5/2019 | Divakaran et al. | |
| 10,482,334 B1* | 11/2019 | Chen | G06F 18/2155 |
| 10,860,873 B2* | 12/2020 | Lakshmi Narayanan | G06V 20/56 |
| 10,891,539 B1* | 1/2021 | Kearney | G06V 10/776 |
| 11,034,357 B2* | 6/2021 | Lakshmi Narayanan | B60W 40/08 |
| 2013/0089303 A1* | 4/2013 | Jiang | H04N 21/233 386/285 |
| 2013/0089304 A1* | 4/2013 | Jiang | G06V 20/41 386/285 |
| 2014/0212853 A1* | 7/2014 | Divakaran | G09B 19/00 434/236 |
| 2015/0230766 A1* | 8/2015 | Wang | A61B 5/0035 600/411 |
| 2015/0269438 A1* | 9/2015 | Samarasekera | G01C 21/3848 382/154 |
| 2016/0224803 A1* | 8/2016 | Frank | G06F 21/6245 |
| 2017/0018033 A1 | 1/2017 | Lee et al. | |
| 2017/0160813 A1* | 6/2017 | Divakaran | G06N 3/006 |
| 2017/0161638 A1* | 6/2017 | Garagic | G06N 7/01 |
| 2017/0206464 A1* | 7/2017 | Clayton | G06N 3/044 |
| 2017/0220854 A1* | 8/2017 | Yang | G06V 20/46 |
| 2017/0251985 A1* | 9/2017 | Howard | G16H 70/60 |
| 2018/0032846 A1* | 2/2018 | Yang | G06V 10/811 |
| 2018/0165554 A1* | 6/2018 | Zhang | G06F 18/2411 |
| 2018/0217585 A1 | 8/2018 | Giering et al. | |
| 2018/0285689 A1 | 10/2018 | Mei et al. | |
| 2018/0300621 A1 | 10/2018 | Shah et al. | |
| 2018/0330112 A1* | 11/2018 | Racz | H04L 63/0457 |
| 2019/0026586 A1* | 1/2019 | Liu | G06V 10/17 |
| 2019/0026942 A1 | 1/2019 | Zhang | |
| 2019/0341025 A1* | 11/2019 | Omote | G10L 25/30 |
| 2020/0104641 A1* | 4/2020 | Alvelda, VII | G06N 3/045 |
| 2020/0175148 A1* | 6/2020 | Toor | H04L 67/01 |
| 2020/0302340 A1* | 9/2020 | Durand | G06N 3/045 |
| 2020/0335092 A1* | 10/2020 | Georgiou | G06N 3/044 |
| 2021/0150315 A1* | 5/2021 | Dang | G06F 17/16 |

FOREIGN PATENT DOCUMENTS

| | | |
|---|---|---|
| CN | 109598387 | 12/2018 |
| CN | 109376896 | 2/2019 |
| CN | 108846375 | 6/2019 |
| CN | 110021165 A | 7/2019 |
| CN | 108805087 | 6/2021 |
| CN | 114730383 A | 7/2022 |
| GB | 2604552 A | 9/2022 |
| JP | 2023050146 A | 4/2023 |
| WO | 2021094920 A1 | 5/2021 |

OTHER PUBLICATIONS

Title={Asynchronous and event-based fusion systems for affect recognition on naturalistic data in comparison to conventional approaches}, author={Lingenfelser et al.}, journal={IEEE Transactions on Affective Computing}, vol. 9, No. 4, pp. 410-423, year={2016}, IEEE (Year: 2016).*
Title={Dual-stream recurrent neural network for video captioning}, author={Xu et al.}, journal={IEEE Transactions on Circuits and Systems for Video Technology}, vol. 29, No. 8, pp. 2482-2493, year={2018}, publisher={IEEE} (Year: 2018).*
Title={Multimodal language analysis with recurrent multistage fusion}, author={Liang et al.}, journal={arXiv preprint arXiv:1808.03920}, year={2018}, pp. 1-14. (Year: 2018).*
Title={Multimodal abstractive summarization of open-domain videos}, author={Libovick\'y et al.}, booktitle={Proceedings of the Workshop on Visually Grounded Interaction and Language (VIGIL). NIPS}, year={2018}, pp. 1-8 (Year: 2018).*
Le et al., title={Dual memory neural computer for asynchronous two-view sequential learning}, 2018, booktitle={Proceedings of the 24th ACM SIGKDD international conference on knowledge discovery \& data mining}, pp. 1637-1645). (Year: 2018).*
Schumaker, Robert P., et al., "Evaluating Sentiment in Financial News Articles", Decision Support Systems, vol. 53, Issue 3, pp. 458-464, Jun. 2012.
Gunduz, Hakan, et al., "Borsa Istanbul (BIST) daily prediction using financial news and balanced feature selection", Expert System with Applications, vol. 42, Issue 22, pp. 9001-9011, Dec. 1, 2015.
Weng, Bin, et al., "Stock market one-day ahead movement prediction using disparate data sources", Expert Systems With Applications, vol. 79, pp. 153-163, 2017.
Akita, Ryo, et al., "Deep Learning for Stock Prediction Using Numerical and Textual Information", IEEE/ACIS Computer and Information Science (ICIS), 2016.
Ramachandram, D., et al., "Deep Multimodal Learning: A survey on recent advances and trends", Deep Learning and Understanding, IEEE Signal Processing Magazine, 34(6), 2017.
Baltrusaitis, T., et al., "Multimodal Machine Learning: A survey and taxonomy", arXiv:1705.09406v2, Aug. 1, 2017.
PCT/IB2020/060577 International Search Report and Written Opinion, dated Feb. 23, 2021.
2020385264, Australian Examination Report No. 1 for Standard Patent Application, dated Feb. 17, 2023.
Britz, "Attention and Memory in Deep Learning and NLP", Denny Britz Blog, Accessed on Nov. 3, 2023, 5 pages, https://dennybritz.com/posts/wildml/attention-and-memory-in-deep-learning-and-NLP.
Dang et al., "AsyncLSTM: Exploring Textual News and Time Series for AsyncLSTM: Exploring Textual News and Time Series for Explanation", 2019 Association for Computing Machinery, 11 pages.

* cited by examiner

FUSING MULTIMODAL DATA USING RECURRENT NEURAL NETWORKS

BACKGROUND

The present embodiments relate to an artificial intelligence platform configured to fuse data across two or more modalities. More specifically, given a multi-modal dataset with at least one modality representing numerical time series data and at least one modality representing time-stamp textual data, the embodiments relate to automatically discovering a subset of text features that strongly correlate performance and behavior of the numerical time series data as it evolves over time.

SUMMARY

The embodiments include a system, computer program product, and method for employing an artificial intelligence platform to fuse data across modalities to identify a correlation of text based data with numerical time series data.

In one aspect, a computer system is provided to support an artificial intelligence (AI) platform. As shown, a processor is operatively coupled to the memory and is in communication with the AI platform. The AI platform is provided with tools to employ deep learning techniques to fuse data across modalities. The tools include a first data feed manager, a second data feed manager, and an analyzer. The first data feed manager is operatively coupled to a first data set, the first data set representing a first modality in a first data format. The second data feed manager is operatively coupled to a second data set, the second data set representing a second modality in a second data form. The first and second data modalities are different. The first data feed manager functions to encode the first data set into a first set of vectors. The second data feed manager functions to encode the second data set into a second set of vectors. The analyzer is operatively coupled to both the first and second data feed managers, and functions to leverage an artificial recurrent neural network (RNN) to analyze the encoded first and second data sets. The analyzer iteratively and asynchronously fuses the encoded features from the first and second data modalities, with the fusing combining vectors from the first and second data sets and representing correlated temporal behavior. The fused vectors are then returned as output data.

In another aspect, a computer program product is provided to employ deep learning techniques to fuse data across two or more modalities. The computer program product includes a computer readable storage medium with embodied program code that is executable by a processor. Program code is provided to receive two or more data sets, with each of the data sets representing a different data modality, including a first data set having a first modality and a second data set having a second modality. The program code separately processes the first and second data sets. The first data set is encoded into one or more first vectors, and the second data set is encoded into one or more second vectors. The processed multi-modal data set is analyzed, and the encoded features from the first and second modalities are iteratively and asynchronously fused. The fused modalities include combined vectors from the first and second data sets representing correlated temporal behavior. The program code then returns the fused vectors as output data.

In yet another aspect, a method is provided to employ deep learning techniques to fuse fused data across two or more modalities. A multi-modal data set is received, including a first data set having a first modality and a second data set having a second modality. The first modality is different from the second modality. The first and second data sets are processed, which includes encoding the first data set into one or more first vectors, and encoding the second data set into one or more second vectors. The processed multi-modal data set is analyzed, and the encoded features from the first and second modalities are iteratively and asynchronously fused. The fused modalities include combined vectors from the first and second data sets representing correlated temporal behavior. The fused vectors are then returned as output data.

These and other features and advantages will become apparent from the following detailed description of the presently preferred embodiment(s), taken in conjunction with the accompanying drawings.

BRIEF DESCRIPTION OF THE SEVERAL VIEWS OF THE DRAWINGS

The drawings referenced herein form a part of the specification. Features shown in the drawings are meant as illustrative of only some embodiments, and not of all embodiments, unless otherwise explicitly indicated.

DETAILED DESCRIPTION

Figure 1:
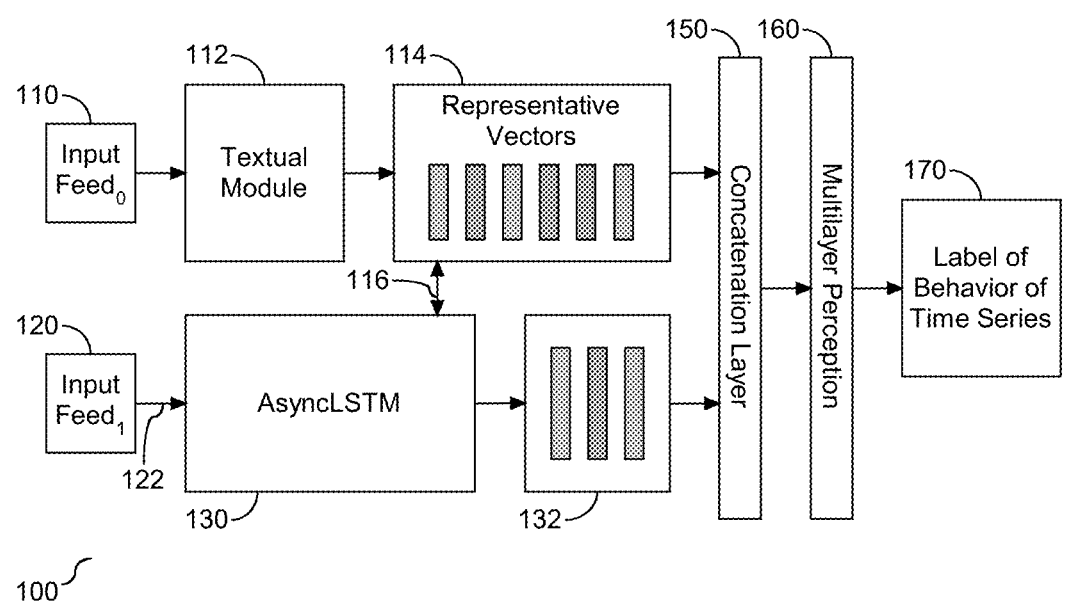
FIG. 1 depicts a diagram illustrating architecture of a neural network.

It will be readily understood that the components of the present embodiments, as generally described and illustrated in the Figures herein, may be arranged and designed in a wide variety of different configurations. Thus, the following detailed description of the embodiments of the apparatus, system, method, and computer program product of the present embodiments, as presented in the Figures, is not intended to limit the scope of the embodiments, as claimed, but is merely representative of selected embodiments.

Reference throughout this specification to "a select embodiment," "one embodiment," or "an embodiment" means that a particular feature, structure, or characteristic described in connection with the embodiment is included in at least one embodiment. Thus, appearances of the phrases "a select embodiment," "in one embodiment," or "in an embodiment" in various places throughout this specification are not necessarily referring to the same embodiment.

The illustrated embodiments will be best understood by reference to the drawings, wherein like parts are designated by like numerals throughout. The following description is intended only by way of example, and simply illustrates certain selected embodiments of devices, systems, and processes that are consistent with the embodiments as claimed herein.

Artificial Intelligence (AI) relates to the field of computer science directed at computers and computer behavior as related to humans. AI refers to the intelligence when machines, based on information, are able to make decisions, which maximizes the chance of success in a given topic. More specifically, AI is able to learn from a data set to solve problems and provide relevant recommendations. For example, in the field of artificial intelligent computer systems, natural language systems (such as the IBM Watson® artificially intelligent computer system or other natural language interrogatory answering systems) process natural language based on system acquired knowledge. To process natural language, the system may be trained with data derived from a database or corpus of knowledge, but the resulting outcome can be incorrect or inaccurate for a variety of reasons.

Machine learning (ML), which is a subset of AI, utilizes algorithms and corresponding neural networks, to learn from data and create foresights based on this data. More specifically, ML is the application of AI through creation of neural networks that can demonstrate learning behavior by performing tasks that are not explicitly programmed. Deep learning is a type of neural-network ML in which systems can accomplish complex tasks by using multiple layers of choices based on output of a previous layer, creating increasingly smarter and more abstract conclusions.

Deep learning is a method of machine learning that incorporates neural networks in successive layers to learn from data in an iterative manner. Neural networks are models of the way the nervous system operates. Basic units are referred to as neurons, which are typically organized into layers. The neural network works by simulating a large number of interconnected processing units that resemble abstract versions of neurons. There are typically three parts in a neural network, including an input layer, with units representing input fields, one or more hidden layers, and an output layer, with a unit or units representing target field(s). The units are connected with varying connection strengths or weights. Input data are presented to the first layer, and values are propagated from each neuron to every neuron in the next layer. At a basic level, each layer of the neural network includes one or more operators or functions operatively coupled to output and input. Output from the operator(s) or function(s) of the last hidden layer is referred to herein as activations. Eventually, a result is delivered from the output layers. Deep learning complex neural networks are designed to emulate how the human brain works, so computers can be trained to support poorly defined abstractions and problems. Neural networks and deep learning are often used in image recognition, speech, and computer vision applications.

AI, especially deep learning, has made significant progress in a lot of areas, such as autonomous driving, machine translation, and speech recognition, with profound impact on our society. A recurrent neural network (RNN) is a type of artificial neural network used in natural language processing (NLP). RNNs are designed to recognize a data's sequential characteristics and use patterns to predict outcomes. As shown and described herein, the RNN is built with a modified Long Short-Term Memory (LSTM) unit to categorize data into short term and long term memory cells. The modified LSTM described in detail below is referred to as Asynchronous RNN (AsyncLSTM) that iteratively fuses encoded features from multiple different data modalities, such as a time series data modality and a textual data modality. Output from the asynchronous RNN includes an explanation of time series behavior.

Referring to FIG. 1, a diagram (100) is provided as an illustration of the neural network architecture. As shown, the model receives data from two input feeds, shown herein as a first feed (110), e.g. feed$_0$, and a second feed (120), e.g. feed$_1$. Data populating the first feed (110) represents a first feed modality, and data populating the second feed (120) represents a second modality, with the first and second modalities being different. For descriptive purposes, the first feed (110) includes textual data and the second feed (120) includes time series data, although the number of modalities of the feeds should not be considered limiting.

As shown, the first feed (110) is operatively coupled to a textual module (112) that is configured for natural language processing (NLP). The textual module (112) learns semantic dependencies among words present in the first feed (110) and aggregates them into a representative vector for each document, or in one embodiment a representative vector for each news story. Input into the textual module (112) at each time period t is a sequence of news stories or articles, n. Each news story or news article in turn is also a sequence of words and is individually analyzed and encoded. The j-th news story is a sequence of news$_t^j = \{x_1^{txt}, x_2^{txt}, \ldots x_k^{txt}\}$, with k being a sequence length, $x_l^{txt} \in \mathbb{R}^V$ as a vector representation of the l-th word in the sequence (l=1, ..., K) and V as the vocabulary size. An embedding layer is used to transform each vector $x_l^{txt}$ into a low dimensional dense vector $e_l \in \mathbb{R}^{d_w}$ via a linear transformation: $e_l = W_e * x_l^{txt}$, such that $W_e \in \mathbb{R}^{d_w \times V}$. The transformation reduces the word dimensionality from the vocabulary size V to $d_w$, with $d_w \ll V$. A set of representative vectors (114) are shown herein as output from the textual module (112). Each vector represents a text based document, such as a news article or document. In one embodiment, the representative vectors (114) are sequentially ordered based on a corresponding time stamp associated with each vector. For example, in one embodiment, each vector is a news article with the corresponding time stamp identifying publication or release of the article.

The sequence of embedded words $\{e_1, e_2, \ldots e_K\}$, each for one textual article or document (110), are fed into textual module (112), which is implemented by single or multi-layer LSTM (or Bi-LSTM) network (also referred to herein by reference numeral (112)) that learns to produce encoded contextual features or representative vectors for the textual article of document (110). The network (112) explores contextual dependencies among ordered words to learn best document representation. One of the main parts of an LSTM unit is the memory cell which preserves essential information of an input sequence through time, and non-linear gating units that regulate information flow in and out of the cell. At each step l in the input sequence, LSTM takes in the input word embedding $e_l$, its previous cell state $c_{l-1}^{txt}$, and the previous output vector $h_{l-1}^{txt}$, to update the memory cell $c_l^{txt}$, and subsequently outputs the word representation $h_l^{txt}$ for $e_l$. Both $c_l^{txt}, h_l^{txt} \in \mathbb{R}^{d_h}$ with $d_h$ being a number of hidden neurons. Accordingly. The LSTM represents a recurrent function $f$ as follows:

$$h_l^{txt} = f(e_l, c_{l-1}^{txt}, h_{l-1}^{txt}), \text{ for } l=1, \ldots, K$$

in which the memory cell $c_l^{txt}$ is updated internally. This network component is applied to every news story collected at time period t and outputs a sequence of vectors $news_t=\{s_1, s_2, \ldots s_n\}$, with n being the total number of news stories collected at the time stamp t. Each vector is represented for a textual article, such as news story, or a sequence of related words.

The AsyncLSTM (130) is configured to manage multiple input sequences of varying lengths. As shown herein, the AsyncLSTM (130) leverages input from the two modalities, including input (116) directed at the sequence of embedded textual documents (e.g., news stories) from the first input $feed_0$ (110), and input (122) from the numerical time series data from the second input $feed_1$ (120). In one embodiment, the first input $feed_0$ (110) is directed at news stories, encoded in representative vectors as $news_t=\{s_1, s_2, \ldots s_n\}$. The AsyncLSTM (130) iteratively fuses encoded features from the different data modalities in an asynchronous manner. While modeling time series, the AsyncLSTM (130) performs multiple steps of interrelation with the text modality to gradually filter out news vectors that are irrelevant to patterns learned in the time series, while retaining news vectors that align well with a current behavior state or performance of the time series data. Encodings from the text data (114) and encodings from the time series data (132) are combined in a concatenation layer (150) to aggregate the encoding into a single vectors and pass through a multilayer perceptron network (160) which produces output (170) in the form of a label of behavior of the time series data for a define period of time.

Figure 2:
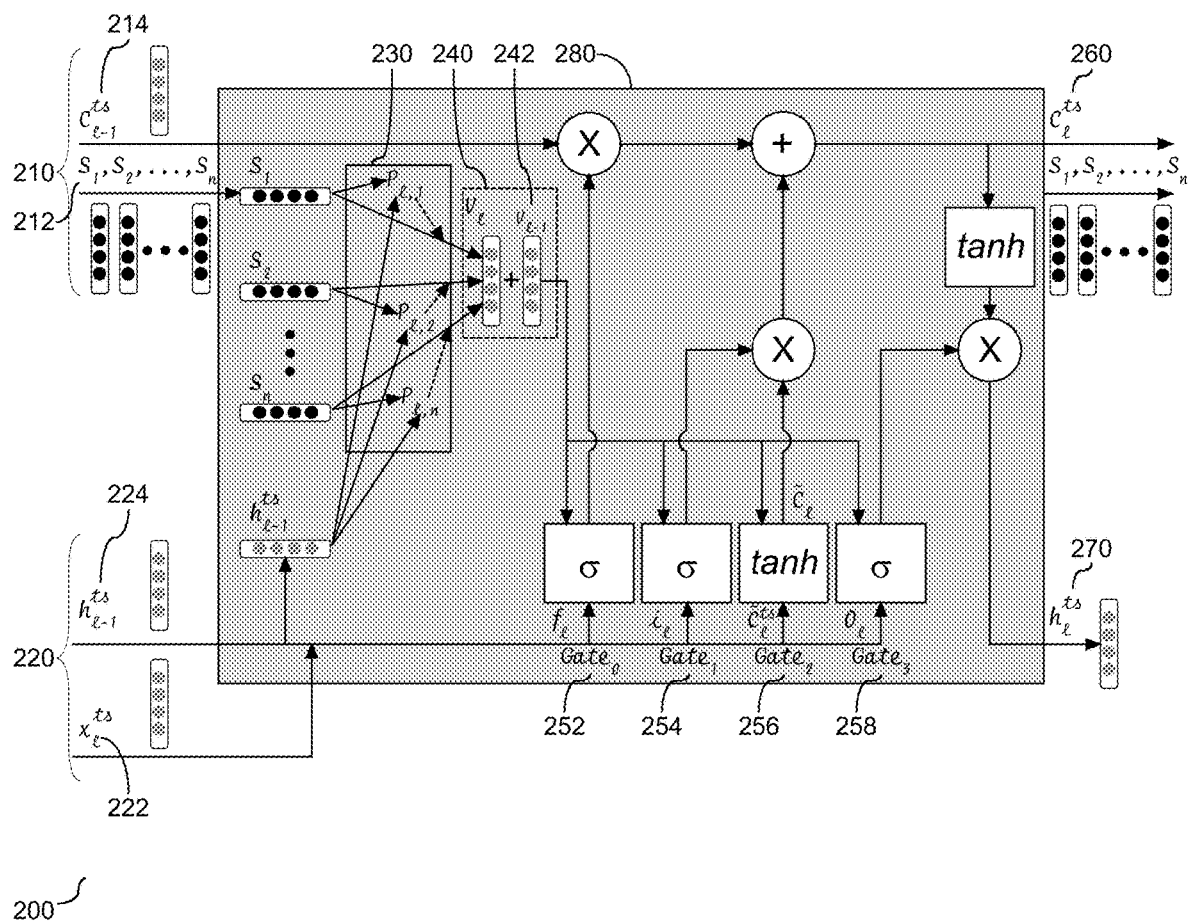
FIG. 2 depicts a diagram illustrating a memory cell of an AsyncLSTM embedded in the neural network architecture shown in FIG. 1.

Referring to FIG. 2, a diagram (200) is provided as an illustration of a memory cell (280) of the AsyncLSTM. As described in FIG. 1, the AsynchLSTM receives two modalities of data, including the sequence of embedded text stories from the first input $feed_0$ (110), also referred to herein as text data, and input (122) from the numerical time series data from the second input $feed_1$ (120). The text and time series modalities are sampled at different frequencies, which make their sequence lengths different. In addition, text is general and can bring noise to the model. The AsyncLSTM is designed and configured to handle multiple input sequences of varying lengths. The model shown and described herein leverages mutual influence between the two data modalities via multiple steps of interrelation between the representative textual vectors and the time series temporal steps. As the AsyncLSTM advances in the time series sequence, it gradually filters out news vectors that are irrelevant to the patterns learned in the time series, and obtains a probability mass of attention on the news stories that best align with the time series sequence.

Input to the memory cell (280) includes time series data from the second input $feed_1$ (220) and textual data from the first input $feed_0$ (210). With respect to the time series data, an input sample (220) at each time point t is a sequence of m values represented as $\{x_{t-m}^{ts}, x_{t-m-1}^{ts}, \ldots, x_{t-1}^{ts}\}$ (222) and a previous hidden state $h_{l-1}^{ts}$ (224). Similarly, an input sample (212), such as a sequence of $news_t$, is represented as $\{s_1, s_2, \ldots s_n\}$ and the previous cell state $c_{l-1}^{ts}$ (214). The network starts with an initialization of an initial cell state $c_0^{ts}$ and an initial hidden state $h_0^{ts}$ by using two separate single layer neural networks applied on an average state of a representative news sequence as follows:

$$c_0^{ts} = \tan h(U_{c_0} * \bar{s} + b_{c_0})$$

$$h_0^{ts} = \tan h(U_{h_0} * \bar{s} + b_{h_0})$$

where $\bar{s}=1/n\Sigma_j s_j$, and $U_{c0}, U_{h0} \in \mathbb{R}^{2d_h \times d_s}$, $b_{c0}, b_{h0} \in \mathbb{R}^{d_s}$, with $d_s$ as a number of neural units in AsyncLSTM, are the network parameters jointly trained with the entire model.

AsyncLSTM incorporates information learned in the textual domain to every step it performs reasoning on in the time series in a selective manner. At each timestep l in the series sequence (220), AsyncLSTM searches through the representative text sequence and assigns them a probability mass, with the assignment directed at alignments with a learned signal in the time series sequence, as captured in the latest hidden state (224). In one embodiment, the probability mass associated with each news representative vector (212) is computed at lth timestamp as follows:

$$a_{l,j} = \tanh(W_a * h_{l-1}^{ts} + U_a * s_j + b_a), \text{ for } l=1, \ldots, m$$

$$p_l = \text{softmax}(v_a^T[a_{l,1}, a_{l,2}, \ldots, a_{l,n}])$$

where $a_l$ is the alignment vector and pi (230) is the probability mass distribution. $W_a$, $U_a$, $b_a$, and $v_a$ are weights connecting neurons and subject to tuning. The weights are defined as follows: $W_a \in \mathbb{R}^{d_s \times d_s}$, $U_a \in \mathbb{R}^{2d_h \times d_s}$, $b_a \in \mathbb{R}^{d_s}$, and $v_a \in \mathbb{R}^n$. The parameter $v_a$ is learned to transform each alignment vector $a_{l,j}$ to a scalar, and by passing through a function, such as softmax function, to ensure a probability mass at output. The coefficients (230) are the probability mass distribution over a news representative sequence (212). Information from these vectors, scaled by their probability mass, influences the learning process over the time series by generating an adaptive context vector, $v_l$, (240) as follows:

$$v_l = \frac{1}{2}(\Sigma_j p_{l,j} * s_j + v_{l-1})$$

where $v_0$ is initialized as a zero vector. At each time period t, the last states of coefficients (230) capture the relevant or correlated information of text modality with respect to the performance/behavior in the time series modality.

As shown, the AsyncLSTM constructs the latest context vector as an average information between the current representation of relevant news stories and a previous context vector, $v_{l-1}$ (242). The aggregated vector from the textual news regulates the information flow to all of the gates, including $gate_0$ (252), $gate_1$ (254), $gate_2$ (256), and $gate_3$ (258). The function, $f_l$, employed at $gate_0$ (252) is an alignment vector between the current state of the times series data and the textual news, and is defined as: $f_l = \sigma(U_{ix} * x_l^{ts} + U_{ih} * h_{l-1}^{ts} + U_{iv} * v_l + b_i)$. The function, $i_l$, employed at $gate_1$ (254) is defined as $i_l = \sigma(U_{fx} * x_l^{ts} + U_{fh} * h_{l-1}^{ts} + U_{fh} * v_l + b_f)$. The function, $\tilde{c}_l^{ts}$, employed at $gate_2$ (256) is defined as $\tilde{c}_l^{ts} = \tanh(U_{cx} * x_l^{ts} + U_{ch} * h_{l-1}^{ts} + U_{cv} * v_l + b_c)$. The function, $o_l$, employed at $gate_3$ (258) is defined as $o_l = \sigma(U_{ox} * x_l^{ts} + U_{oh} * h_{l-1}^{ts} + U_{ov} * v_l + b_o)$. In each of the gates, U represents a weight matrix of the neural model and is learned over time. The current cell states, $c_l^{ts}$, (260) and hidden states, $h_l^{ts}$, (270) are then updated and forwarded as input to the next cell in the AsyncLSTM, where the current state is defined as: $c_l^{ts} = f_l \odot c_{l-1}^{ts} + i_l [ \tilde{c}_l^{ts}$ and the hidden state is defined as $h_l^{ts} = o_l^{ts} \odot \tanh(c_l^{ts})$. The hidden state is a neural function that infers a new state of the time series data based on time series input, a recurrent neural network (RNN) memory cell, and relevant information from the textual news. By tightly integrating information learned in the textual news domain, e.g. modality corresponding to the first input feed, to every step in modeling the time series modality corresponding to the second input feed, the neural network distributes the burden of work in discovering relevant data in the first input feed through the course of the time series data.

The discovered relevant data in the first input feed is exploited to the learn patterns in the second input feed. As the AsyncLSTM progressively advances in the time series, it gradually rules out data from the first input feed that is least matching with patterns learned in the second input feed. The neural network converges to a set of data in the first input feed that are captured by the last probability mass vector $p_m$, from which entries are used to interpret the degree of importance of each individual news story represented in the first input feed.

Figure 3:
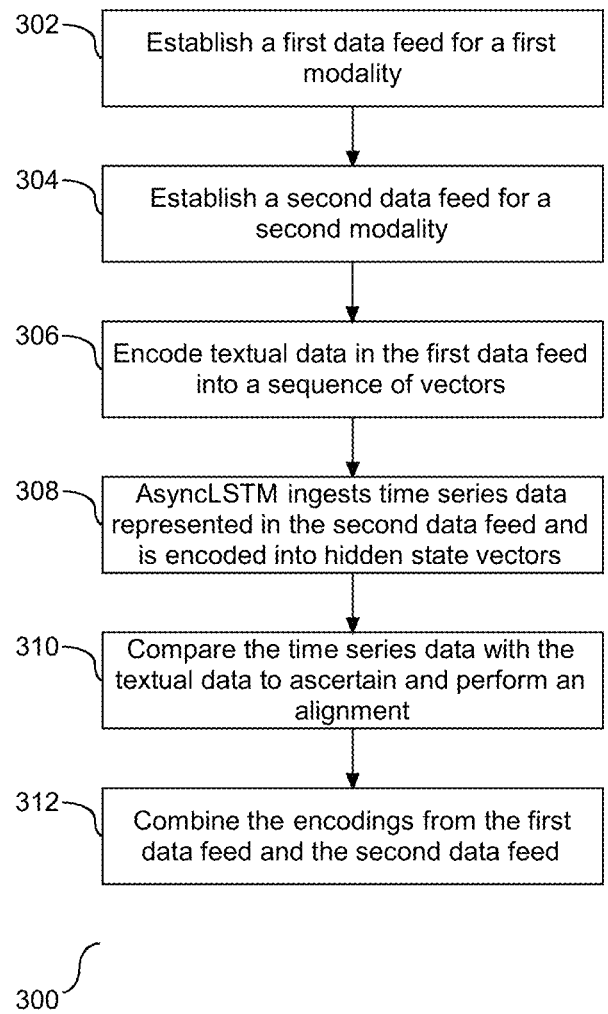
FIG. 3 depicts a flow chart illustrating fusion from multi-modal data using recurrent neural networks.

Referring to FIG. 3, a flow chart (300) is provided to illustrate fusion of a multi-modal data using recurrent neural networks. Two modalities are defined and configured as data feeds, including establishing a first data feed for a first modality (302) and a second data feed for a second modality (304). The modalities shown and described include textual data received in the first data feed and time series data received in the second data feed. In one embodiment, additional or different modalities may be employed, and as such, the modalities shown and described herein should not be considered limiting. Each of the input feeds (302) and (304) may have different lengths. Textual data in the first data feed are encoded into a sequence of vectors (306), as shown and described in FIG. 2. The quantity of text encoded vectors at step (306) is based on a sampling size of the textual data. The time series data represented in the second data feed is ingested by the AsyncLSTM and is encoded into hidden state vectors (308) to learn long term dependency. While modeling the time series modality, the AsyncLSTM performs multiple steps of interrelation with the text modality of the first data feed, and gradually filters out irrelevant data while retaining data that align with the current behavior state and performance of the time series data (310). More specifically, the filtering at step (310) includes comparison of the time series data with the textual data to ascertain and performance of an alignment, if a relationship of the data represented in the feeds exist. The encodings from the first data feed and the second data feed are fused, e.g. combined, (312), and represent an alignment of data from the first data feed that interprets or otherwise explains the behavior of the second data feed during a defined time interval. The fused data (312), e.g. fused vectors, are also referred to herein as inter-modality data. The fused data (312) represent textual data from the first input feed that is closely aligned with behavior and performance of the time-series from the second input feed. Accordingly, an alignment of a subset of data across the data modalities is ascertained and returned as output data.

Figure 4:
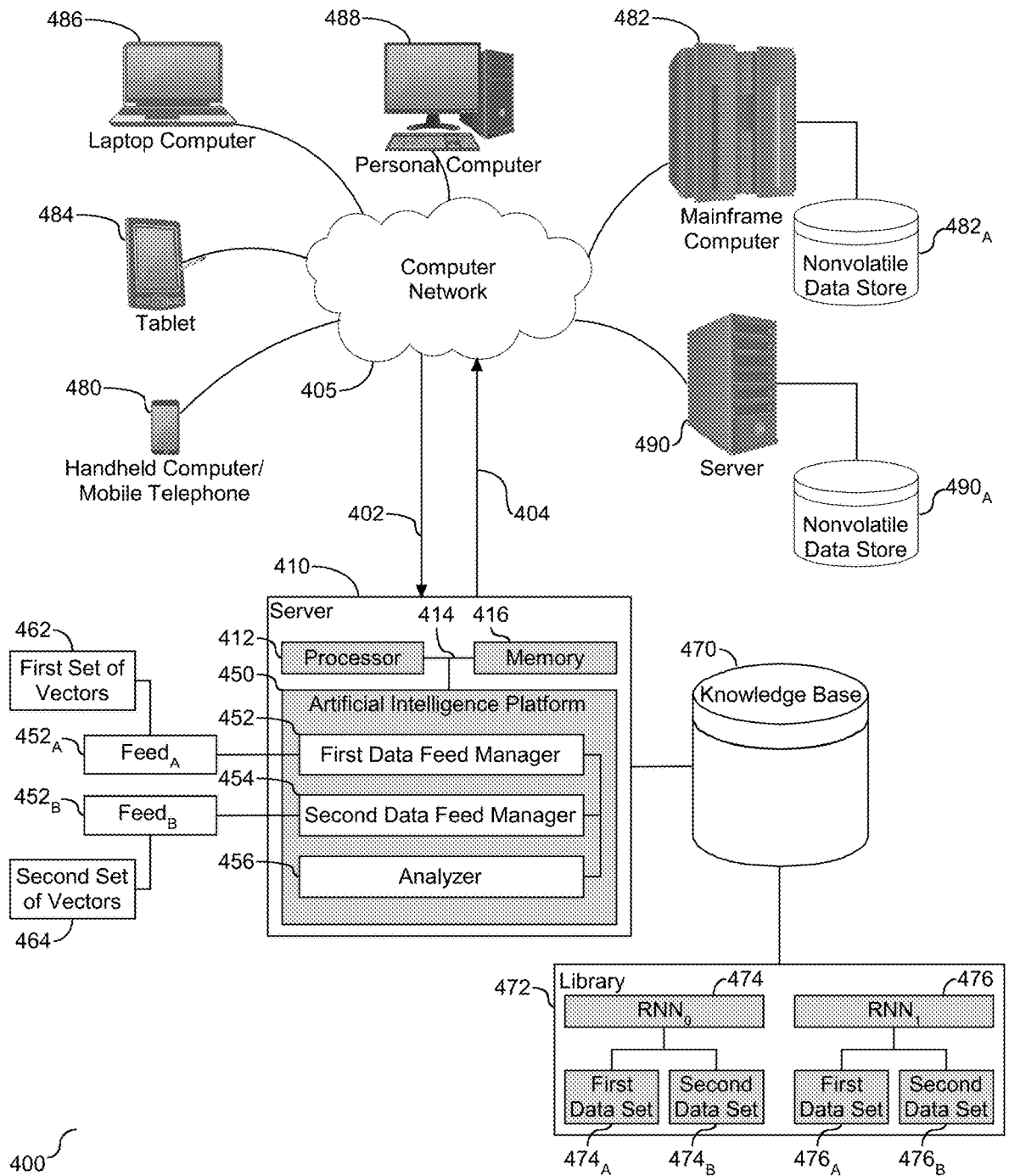
FIG. 4 depicts a system diagram illustrating a computer system with an integrated artificial intelligence platform to support fusion of the multi-modal data.

Referring to FIG. 4, a schematic diagram of a computer system (400) with an integrated artificial intelligence platform to support fusion of the multi-modal data is depicted. As shown, a server (410) is provided in communication with a plurality of computing devices (480), (482), (484), (486), (488), and (490) across a network connection (405). The server (410) is configured with a processing unit (412) in communication with memory (416) across a bus (414). The server (410) is shown with an artificial intelligence (AI) platform (450) configured to support deep learning neural networks over the network (405) from one or more of the computing devices (480), (482), (484), (486), (488), and (490). More specifically, the computing devices (480), (482), (484), (486), (488), and (490) communicate with each other and with other devices or components via one or more wired and/or wireless data communication links, where each communication link may comprise one or more of wires, routers, switches, transmitters, receivers, or the like. In this networked arrangement, the server (410) and the computer network (405) enable communication detection, recognition, and resolution. The server (410) is in operative communication with the computer network through communications links (402) and (404). Links (402) and (404) may be wired or wireless. Other embodiments of the server (410) may be used with components, systems, sub-systems, and/or devices other than those that are depicted herein.

The AI platform (450) is shown herein configured with tools to employ deep learning techniques to fuse data across two or more modalities. More specifically, the tools iteratively fuse encoded features from different data modalities in an asynchronous manner. The tools shown herein include a first data feed manager (452) and a second data feed manager (454). The first data feed manager (452) is operatively coupled to a first data feed, $feed_A$ ($452_A$), communicated across the link (402) from one of the operatively coupled devices (480)-(490). Data represented in the first data feed, $feed_A$ ($452_A$), has a first modality. Similarly, the second data feed manager (454) is operatively coupled to a second data feed, $feed_B$ ($452_B$), communicated across the link (402) from one of the operatively coupled devices (480)-(490). Data represented in the second data feed, $feed_B$ ($452_B$), has a second modality. The first and second modalities are different. Accordingly, the first and second data feed managers (452) and (454), respectively, are directed to heterogeneous data collected from multiple sources across the network connection (405).

Each of the first and second data feeds, ($452_A$) and ($452_B$), respectively, are subject to proceeding. More specifically, the first data feed manager (452) subjects $feed_A$ ($452_A$) to encoding or an encoding process, and the second data feed manager (454) subjects $feed_B$ ($452_B$) to encoding or an encoding process. The first feed ($452_A$) is encoded into a first set of vectors (462) by the first data feed manager (452), and the second feed ($452_B$) is encoded into a second set of vectors (464) by the second data feed manager (454). In the case of textual based modality, the corresponding data feed manager learns semantic dependencies among words and aggregates corresponding text into a representative vector for each input text document. In one embodiment, the encoding and corresponding encoding processes take place in parallel. Accordingly, the first and second data feeds representing different data modalities are subjected to encoding into corresponding vectors.

As shown, an artificial recurrent neural network (RNN) analyzer (456), is operatively coupled to the first and second feed managers (452) and (454), respectively. The analyzer functions to model both the encoded first data feed modality and the second data feed modality and to provide an explanation of behaviors of one or both of the modalities. In one embodiment, the RNN is an asynchronous long-short term memory (AsyncLSTM), as shown and described in FIG. 1. The analyzer (456) analyzes the first and second encoded data sets (462) and (464), respectively. This analysis includes iteratively and asynchronously fusing encoded features from the first and second data modalities, with the fusing including combining vectors from the first and second data sets with the combination representing correlated temporal behavior.

For example, in one embodiment, the first data feed, $feed_A$ ($452_A$), represents a time-stamped textual modality, which may be in the form of text based articles, reports, and social media data feeds, and the second data feed, $feed_B$ ($452_B$), represents time series data modality. In this example, the analyzer (456) models both the time series modality and the textual modality, and provides an explanation of time series behavior through a succinct set of relevant news stories while retaining a competitive prediction accuracy through iterative and asynchronous fusing. The analysis by the analyzer (456) includes exploration to inter-relate information from at least two temporal sequences of the same or different sampling frequencies. The fusing entails the analyzer (456) to filter out one or more representative vectors from the first data feed (452$_A$) that is irrelevant to patterns ascertained in the encoded second data set (464). Accordingly, the analyzer (456) allows and enables direct incorporation of semantic information learned from the modality of the first data feed to every time step reasoning on the behaviors of the time series data modality of the second data feed.

The tools shown herein include, but are not limited to, first and second feed managers (452) and (454), respectively, and the analyzer (456). The AI platform (450) may receive input from two or more of the computing devices (480)-(490) across the network (405) and leverage a data source (470), also referred to herein as a corpus or knowledge base, to selectively access a RNN and other data. As shown the data source (470) is configured with a library (472) with a plurality of data sets and corresponding RNNs that are created and managed by the analyzer (456). For example, and as shown herein, the library (472) is shown with two RNNs, including RNN$_0$ (474) and RNN$_1$ (476), and associated first and second data sets. RNN$_0$ (474) includes first data set (474$_A$) and second data set (474$_B$), with the first and second data sets having different modalities, and RNN$_1$ (476) includes first data set (476$_A$) and second data set (476$_B$) having different modalities. The first data sets (474$_A$) and (476$_A$) are encoded by the first data feed manager (452) and the second data sets (474$_B$) and (476$_B$) are encoded by the second data feed manager (454). In one embodiment, a third data set comprised of a third data modality may be encoded and managed by the analyzer (456). The quantity of additional data modalities should not be considered limiting. Accordingly, the data sets and corresponding neural model are shown local to the knowledge base (470) that is operatively coupled to the server (410) and the AI platform (450).

It is understood in the art that the analyzer and corresponding RNN(s) discover in an unsupervised manner relevant textual information from the first data feed that explains a given time series represented in the second data feed. The following is an example of application of the RNN and corresponding data exploration. In the venue of financial market use case, the market is predicted as optimistic or pessimistic. A market predication is computed via a second order differential of an adjusted close price of a stock. The first modality is textual data associated with or identifying the stock, and the second modality is time series data directed to the price of the stock and any changes of the prices over a period of time. Let $x_{t-1}^{ts}$, $x_t^{ts}$, and $x_{t+1}^{ts}$ denote an adjusted close price on three adjacent trading data. Market sentiment for day t+1 is optimistic if $\Delta^2 x_{t+1}^{ts} = \Delta(\Delta^2 x_{t+1}^{ts}) = \Delta x_{t+1}^{ts} - \Delta^2 x_t^{ts} > 0$. Market sentiment for t+1 is pessimistic if $\Delta^2 x_{t+1}^{ts} \leq 0$. Market movement for t+1 is up if $(\Delta x_{t+1}^{ts}) = x_{t+1}^{ts} - x_t^{ts} > 0$. Market sentiment for t+1 is down if $(\Delta x_{t+1}^{ts}) \leq 0$.

Figure 5:
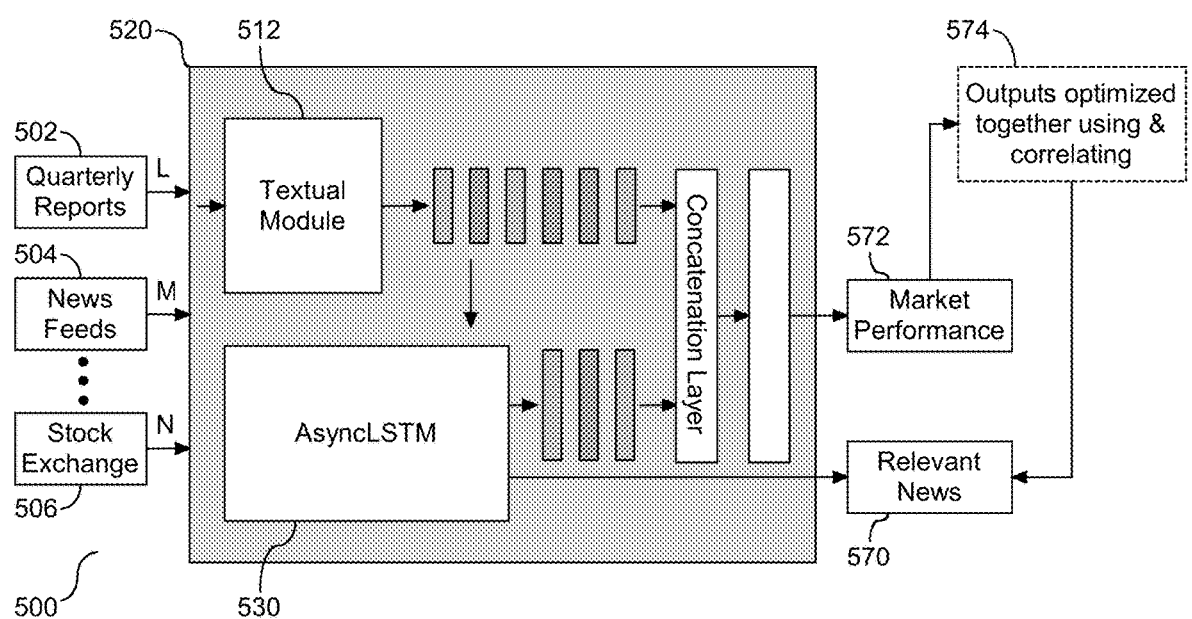
FIG. 5 depicts a block diagram illustrating the neural network architecture of FIG. 1 as applied to the financial markets.

In another example, multi-modality data from stocks and financial news are used to understanding performance of financial markets, and if signals in financial news data can be utilized to understand volatility in the financial markets, and if a specific piece of next, e.g. word phrases, in textual news data has futuristic impact on market performance. Referring to FIG. 5, a block diagram (500) is provided to illustrate the neural network architecture (520) of FIG. 1 as applied to the financial markets. As shown, quarterly reports are represented in a first feed (502) and news articles are represented in a second feed (504). Both the quarterly reports and the news articles are textual data, and are received by textual module (512) that is configured for natural language processing (NLP). The textual module (512) learns semantic dependencies among words present in the first feed (502) and the second feed (504) and aggregates them into a representative vector for each document, or in one embodiment a representative vector for each news story. Input into the textual module (512) at each time period t is a sequence of news stories or articles, n. Each news story or news article is individually analyzed and encoded. Similarly, a third data feed (506) is in time series data in the form of stock exchange data. The third data feed is received by an operatively coupled asynchronous LSTM (AsyncLSTM) network (530) that learns to produce encoded contextual features. The remaining elements of the neural network architecture are shown and described in FIG. 1. Output (574) from the architecture is directed at news filtering by highlighting the most relevant news (570) in association with stock time-series behaviors and performance (572). More specifically, the news (570) and the performance behavior (572) are fused into the output (574).

The network (405) may include local network connections and remote connections in various embodiments, such that the artificial intelligence platform (450) may operate in environments of any size, including local and global, e.g. the Internet. Additionally, the AI platform (450) serves as a front-end system that can make available a variety of knowledge extracted from or represented in network accessible sources and/or structured data sources. In this manner, some processes populate the AI platform (450), with the AI platform (450) also including one or more input interfaces or portals to receive requests and respond accordingly.

Figure 6:
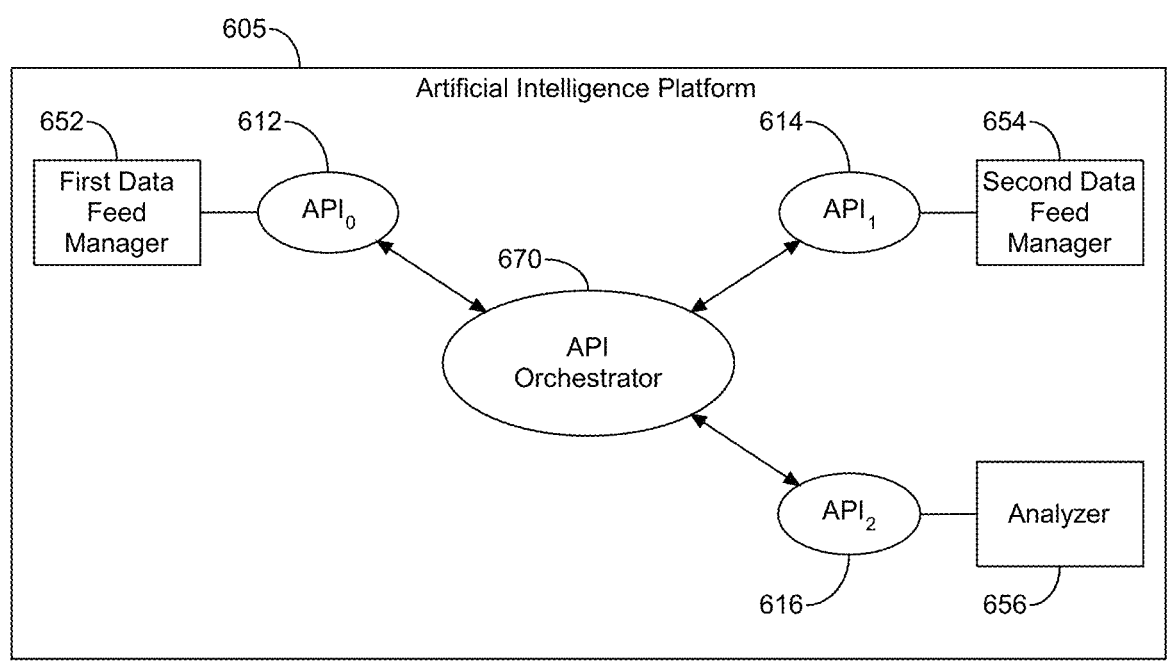
FIG. 6 depicts a block diagram illustrating the artificial intelligence platform tools, as shown and described in FIG. 4, and their associated application program interfaces.

An Application Program Interface (API) is understood in the art as a software intermediary, e.g. invocation protocol, between two or more applications which may run on one or more computing environments. With respect to the AI platform (450) shown and described in FIG. 4, one or more APIs may be utilized to support one or more of the tools (452)-(456) and their associated functionality. Referring to FIG. 6, a block diagram (600) is provided illustrating the tools (452)-(456) and their associated APIs. As shown, a plurality of tools is embedded within the AI platform (605), with the tools including, but not limited to, the first data feed manager (452) shown herein as (652) and associated with API$_0$ (612), the second data feed manager (454) shown herein as (654) and associated with API$_2$ (614), and the analyzer (456) shown herein as (656) and associated with API$_2$ (616). Each of the APIs support and enable the functionality of the respectively coupled manager, as described in FIG. 4, and may be implemented in one or more languages and interface specifications. API$_0$ (612) provides functional support to process and encode a first data feed having a first modality; API$_2$ (614) provides functional support to process and encode a second data feed having a second modality different from the first modality, and API$_2$ (616) provides functional support to fuse data across two or more modalities and to inter-relate information from at least two temporal sequences of the same or different sampling frequencies.

As shown, each of the APIs (612), (614), and (616) are operatively coupled to an API orchestrator (670), otherwise known as an orchestration layer, which is understood in the art to function as an abstraction layer to transparently thread together the separate APIs. In one embodiment, the functionality of the separate APIs may be joined or combined. As such, the configuration of the APIs shown herein should not be considered limiting. Accordingly, as shown herein, the functionality of the tools may be embodied or supported by their respective APIs.

Embodiments shown and described herein may be in the form of a computer system for use with an intelligent computer platform for providing orchestration of activities across one or more domains to minimize risk. Aspects of the tools (452)-(456) and their associated functionality may be embodied in a computer system/server in a single location, or in one embodiment, may be configured in a cloud based system sharing computing resources. With references to FIG. 7, a block diagram (700) is provided illustrating an example of a computer system/server (702), hereinafter referred to as a host (702) in in a cloud computing environment (710), to implement the system, tools, and processes described above with respect to FIGS. 1-6. Host (702) is operational with numerous other general purpose or special purpose computing system environments or configurations. Examples of well-known computing systems, environments, and/or configurations that may be suitable for use with host (702) include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and file systems (e.g., distributed storage environments and distributed cloud computing environments) that include any of the above systems, devices, and their equivalents.

Host (702) may be described in the general context of computer system-executable instructions, such as program modules, being executed by a computer system. Generally, program modules may include routines, programs, objects, components, logic, data structures, and so on that perform particular tasks or implement particular abstract data types. Host (702) may be practiced in distributed cloud computing environments where tasks are performed by remote processing devices that are linked through a communications network. In a distributed cloud computing environment, program modules may be located in both local and remote computer system storage media including memory storage devices.

Figure 7:
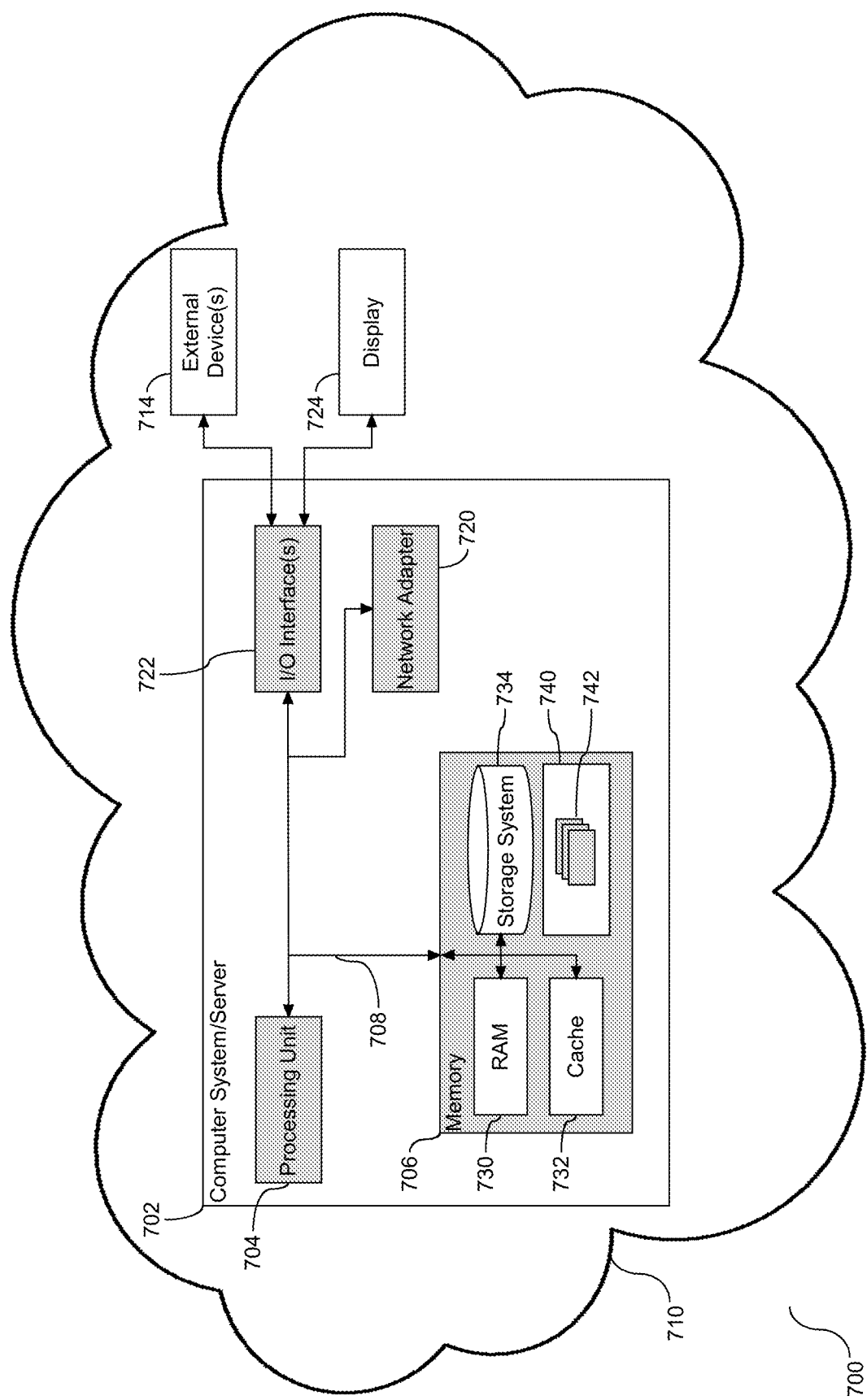
FIG. 7 depicts a block diagram illustrating an example of a computer system/server of a cloud based support system, to implement the system and processes described above with respect to FIGS. 1-6.

As shown in FIG. 7, host (702) is shown in the form of a general-purpose computing device. The components of host (702) may include, but are not limited to, one or more processors or processing units (704), e.g. hardware processors, a system memory (706), and a bus (708) that couples various system components including system memory (706) to processor (704). Bus (708) represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus. Host (702) typically includes a variety of computer system readable media. Such media may be any available media that is accessible by host (702) and it includes both volatile and non-volatile media, removable and non-removable media.

Memory (706) can include computer system readable media in the form of volatile memory, such as random access memory (RAM) (730) and/or cache memory (732). By way of example only, storage system (734) can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus (708) by one or more data media interfaces.

Program/utility (740), having a set (at least one) of program modules (742), may be stored in memory (706) by way of example, and not limitation, as well as an operating system, one or more application programs, other program modules, and program data. Each of the operating systems, one or more application programs, other program modules, and program data or some combination thereof, may include an implementation of a networking environment. Program modules (742) generally carry out the functions and/or methodologies of embodiments to employ deep learning techniques to fuse data across two or more modalities. For example, the set of program modules (742) may include the tools (452)-(456) as described in FIG. 4.

Host (702) may also communicate with one or more external devices (714), such as a keyboard, a pointing device, etc.; a display (724); one or more devices that enable a user to interact with host (702); and/or any devices (e.g., network card, modem, etc.) that enable host (702) to communicate with one or more other computing devices. Such communication can occur via Input/Output (I/O) interface(s) (722). Still yet, host (702) can communicate with one or more networks such as a local area network (LAN), a general wide area network (WAN), and/or a public network (e.g., the Internet) via network adapter (720). As depicted, network adapter (720) communicates with the other components of host (702) via bus (708). In one embodiment, a plurality of nodes of a distributed file system (not shown) is in communication with the host (702) via the I/O interface (722) or via the network adapter (720). It should be understood that although not shown, other hardware and/or software components could be used in conjunction with host (702). Examples, include, but are not limited to: microcode, device drivers, redundant processing units, external disk drive arrays, RAID systems, tape drives, and data archival storage systems, etc.

In this document, the terms "computer program medium," "computer usable medium," and "computer readable medium" are used to generally refer to media such as main memory (706), including RAM (730), cache (732), and storage system (734), such as a removable storage drive and a hard disk installed in a hard disk drive.

Computer programs (also called computer control logic) are stored in memory (706). Computer programs may also be received via a communication interface, such as network adapter (720). Such computer programs, when run, enable the computer system to perform the features of the present embodiments as discussed herein. In particular, the computer programs, when run, enable the processing unit (704) to perform the features of the computer system. Accordingly, such computer programs represent controllers of the computer system.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a dynamic or static random access memory (RAM), a read-only memory (ROM), an erasable programmable read-only memory (EPROM or Flash memory), a magnetic storage device, a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present embodiments may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Java, Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server or cluster of servers. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the embodiments.

In one embodiment, host (702) is a node of a cloud computing environment. As is known in the art, cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models. Example of such characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher layer of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some layer of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based email). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load balancing between clouds).

A cloud computing environment is service oriented with a focus on statelessness, low coupling, modularity, and semantic interoperability. At the heart of cloud computing is an infrastructure comprising a network of interconnected nodes.

Figure 8:
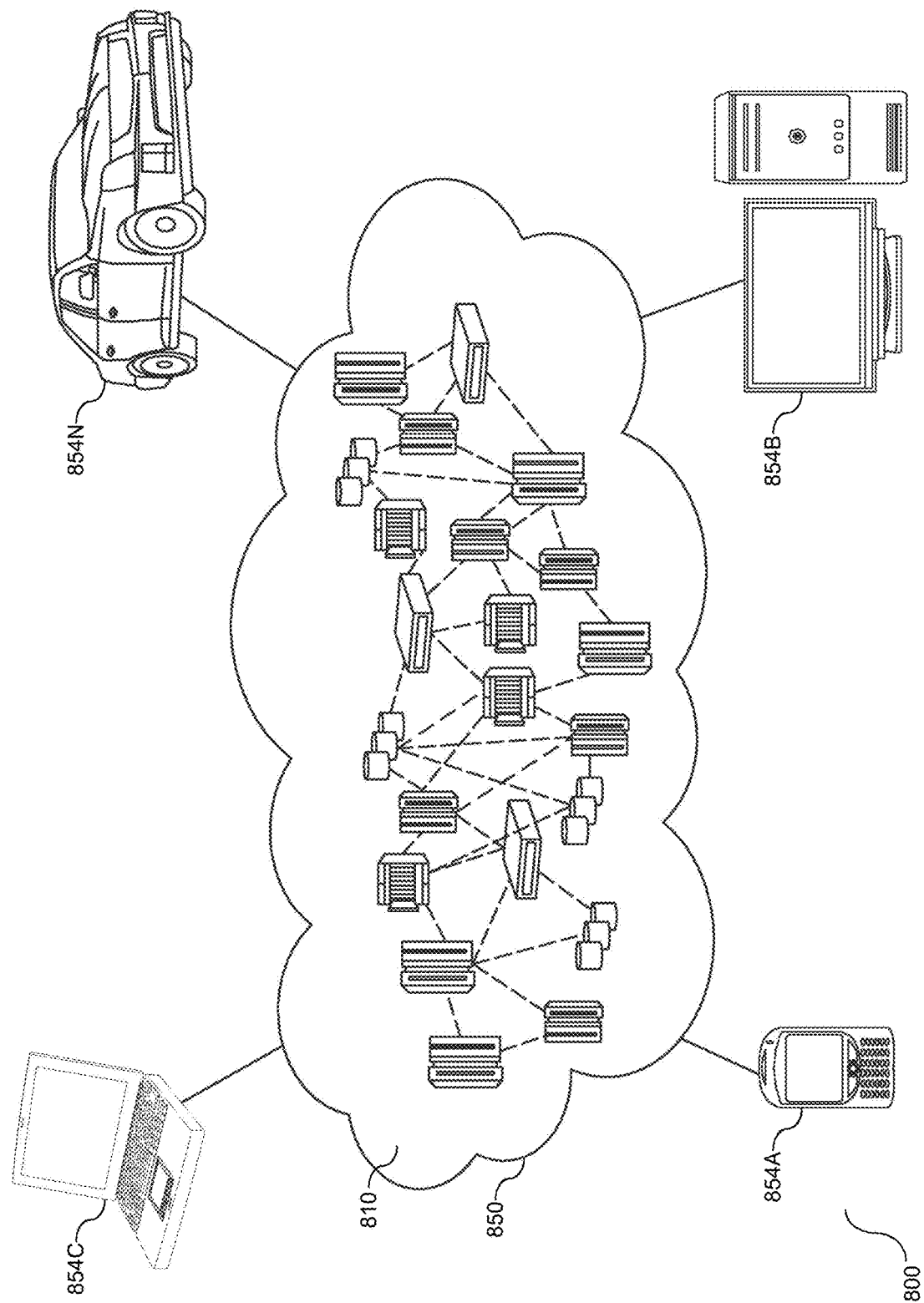
FIG. 8 depicts a block diagram illustrating a cloud computer environment.

Referring now to FIG. 8, an illustrative cloud computing network (800). As shown, cloud computing network (800) includes a cloud computing environment (850) having one or more cloud computing nodes (810) with which local computing devices used by cloud consumers may communicate. Examples of these local computing devices include, but are not limited to, personal digital assistant (PDA) or cellular telephone (854A), desktop computer (854B), laptop computer (854C), and/or automobile computer system (854N). Individual nodes within nodes (810) may further communicate with one another. They may be grouped (not shown) physically or virtually, in one or more networks, such as Private, Community, Public, or Hybrid clouds as described hereinabove, or a combination thereof. This allows cloud computing environment (800) to offer infrastructure, platforms and/or software as services for which a cloud consumer does not need to maintain resources on a local computing device. It is understood that the types of computing devices (854A-N) shown in FIG. 8 are intended to be illustrative only and that the cloud computing environment (850) can communicate with any type of computerized device over any type of network and/or network addressable connection (e.g., using a web browser).

Figure 9:
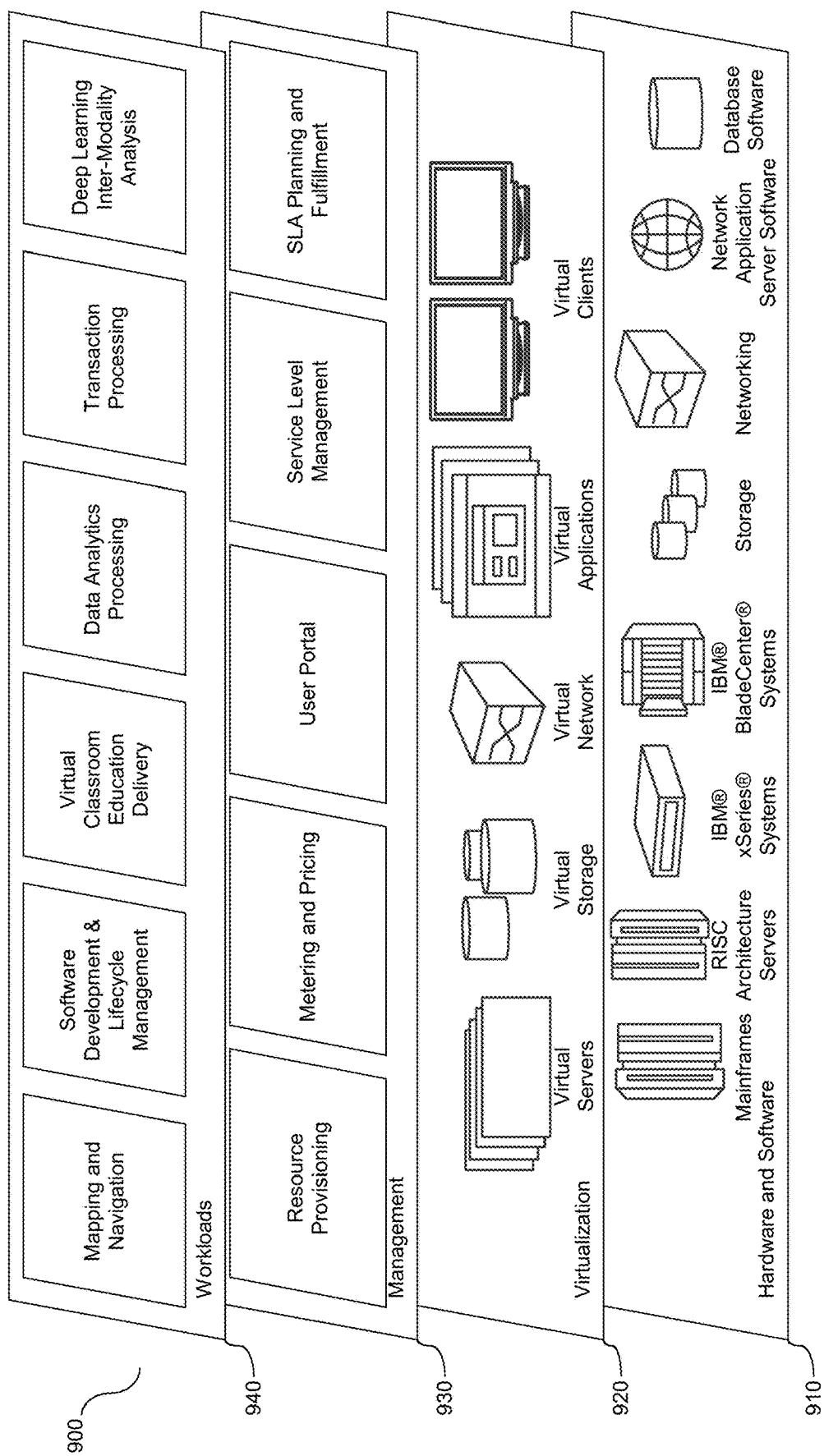
FIG. 9 depicts a block diagram illustrating a set of functional abstraction model layers provided by the cloud computing environment.

Referring now to FIG. 9, a set of functional abstraction layers (900) provided by the cloud computing network of FIG. 8 is shown. It should be understood in advance that the components, layers, and functions shown in FIG. 9 are intended to be illustrative only, and the embodiments are not limited thereto. As depicted, the following layers and corresponding functions are provided: hardware and software layer (910), virtualization layer (920), management layer (930), and workload layer (940).

The hardware and software layer (910) includes hardware and software components. Examples of hardware components include mainframes, in one example IBM® zSeries® systems; RISC (Reduced Instruction Set Computer) architecture based servers, in one example IBM pSeries® systems; IBM xSeries® systems; IBM BladeCenter® systems; storage devices; networks and networking components. Examples of software components include network application server software, in one example IBM WebSphere® application server software; and database software, in one example IBM DB2® database software. (IBM, zSeries, pSeries, xSeries, BladeCenter, WebSphere, and DB2 are trademarks of International Business Machines Corporation registered in many jurisdictions worldwide).

Virtualization layer (920) provides an abstraction layer from which the following examples of virtual entities may be provided: virtual servers; virtual storage; virtual networks, including virtual private networks; virtual applications and operating systems; and virtual clients.

In one example, management layer (930) may provide the following functions: resource provisioning, metering and pricing, user portal, service layer management, and SLA planning and fulfillment. Resource provisioning provides dynamic procurement of computing resources and other resources that are utilized to perform tasks within the cloud computing environment. Metering and pricing provides cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal provides access to the cloud computing environment for consumers and system administrators. Service layer management provides cloud computing resource allocation and management such that required service layers are met. Service Layer Agreement (SLA) planning and fulfillment provides pre-arrangement for, and procurement of, cloud computing resources for which a future requirement is anticipated in accordance with an SLA.

Workloads layer (940) provides examples of functionality for which the cloud computing environment may be utilized. Examples of workloads and functions which may be provided from this layer include, but are not limited to: mapping and navigation; software development and lifecycle management; virtual classroom education delivery; data analytics processing; transaction processing; and deep learning inter-modality data analysis.

It will be appreciated that there is disclosed herein a system, method, apparatus, and computer program product for evaluating natural language input, detecting an interrogatory in a corresponding communication, and resolving the detected interrogatory with an answer and/or supporting content.

While particular embodiments of the present embodiments have been shown and described, it will be obvious to those skilled in the art that, based upon the teachings herein, changes and modifications may be made without departing from the embodiments and its broader aspects. Therefore, the appended claims are to encompass within their scope all such changes and modifications as are within the true spirit and scope of the embodiments. Furthermore, it is to be understood that the embodiments are solely defined by the appended claims. It will be understood by those with skill in the art that if a specific number of an introduced claim element is intended, such intent will be explicitly recited in the claim, and in the absence of such recitation no such limitation is present. For a non-limiting example, as an aid to understanding, the following appended claims contain usage of the introductory phrases "at least one" and "one or more" to introduce claim elements. However, the use of such phrases should not be construed to imply that the introduction of a claim element by the indefinite articles "a" or "an" limits any particular claim containing such introduced claim element to embodiments containing only one such element, even when the same claim includes the introductory phrases "one or more" or "at least one" and indefinite articles such as "a" or "an"; the same holds true for the use in the claims of definite articles.

The present embodiments may be a system, a method, and/or a computer program product. In addition, selected aspects of the present embodiments may take the form of an entirely hardware embodiment, an entirely software embodiment (including firmware, resident software, micro-code, etc.) or an embodiment combining software and/or hardware aspects that may all generally be referred to herein as a "circuit," "module" or "system." Furthermore, aspects of the present embodiments may take the form of computer program product embodied in a computer readable storage medium (or media) having computer readable program instructions thereon for causing a processor to carry out aspects of the present embodiments. Thus embodied, the disclosed system, a method, and/or a computer program product is operative to improve the functionality and operation of an artificial intelligence platform to employ deep learning techniques to fuse data across two or more modalities.

Aspects of the present embodiments are described herein with reference to flowchart illustrations and/or block diagrams of methods, apparatus (systems), and computer program products according to embodiments. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present embodiments. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

It will be appreciated that, although specific embodiments have been described herein for purposes of illustration, various modifications may be made without departing from the spirit and scope of the embodiments. For example, the data represented in the modalities shown and described herein may include financial data, climate data, medical data, and computer vision data. Accordingly, the scope of protection of the embodiments is limited only by the following claims and their equivalents.

What is claimed is:

1. A computer system comprising:
   a processor operatively coupled to memory; and
   an artificial intelligence (AI) platform, in communication with the processor, having machine learning (ML) tools to employ deep learning techniques operable to fuse data across modalities, the tools comprising:
   a first data feed manager operatively coupled to a first data set, the first data set having a first modality in a first data format;
   a second data feed manager operatively coupled to a second data set, the second data set having a second modality in a second data form, the second modality being different from the first modality;
   the first data feed manager configured to encode the first data set into first encodings comprising a first set of vectors;
   the second data feed manager configured to encode the second data set into second encodings comprising a second set of vectors; and
   an analyzer operatively coupled to the first and second data feed managers, the analyzer configured to:
   explore inter-relation of information from at least two temporal sequences of a same or different sampling frequency;
   enable direct incorporation of semantic information learned from the first modality of the first data feed to every time step reasoning on behaviors of the second modality of the second data feed;
   leverage an artificial recurrent neural network (RNN) to analyze the encoded first and second data sets, including iteratively and asynchronously fuse the first and second encodings, the fusing comprising combining vectors from the first and second sets of vectors representing correlated temporal behavior; and
   return the fused vectors as output data.

2. The system of claim 1, wherein first input data from the first data set represents a time-stamped textual data feed and second input data from the second data set represents time series data.

3. The system of claim 2, wherein the leverage of the RNN to iteratively and asynchronously fuse the first and second encodings comprises the RNN configured to correlate temporal behavior of the time series data of the second data set with representative vectors from the first set of vectors.

4. The system of claim 2, wherein the leverage of the RNN to iteratively and asynchronously fuse the first and second encodings comprises the RNN configured to filter out one or more representative vectors from the first set of vectors irrelevant to patterns ascertained in the second set of vectors.

5. The system of claim 2, wherein the first data feed manager configured to encode the first data set representing the time-stamped textual data feed comprises the first data manager configured to learn semantic dependencies among words of the time-stamped textual data feed and aggregate the words into a representative vector for each input text document.

6. The system of claim 1, wherein the RNN is further configured to explore and inter-relate information from at least two temporal sequences of different sampling frequencies.

7. A computer program product to employ deep learning techniques to fuse data across modalities, the computer program product comprising:
a computer readable storage medium having program code embodied therewith, the program code executable by a processor to:
receive a multi-modal data set, the multi-modal data set comprising data in different formats from two or more modalities, including a first data set having a first modality and a second data set having a second modality that differs from the first modality;
separately process the first and second data sets, including encode the first data set into first encodings comprising one or more first vectors and encode the second data set into second encodings comprising one or more second vectors;
analyze the processed multi-modal data set, including exploring inter-relation of information from at least two temporal sequences of a same or different sampling frequency, enabling direct incorporation of semantic information learned from the first modality of the first data feed to every time step reasoning on behaviors of the second modality of the second data feed, iteratively and asynchronously fuse the first and second encodings, the fusion comprising combining the first and second vectors representing correlated temporal behavior; and
return the fused vectors as output data.

8. The computer program product of claim 7, wherein first input data from the first data set represents a time-stamped textual data feed and second input data from the second data set represents time series data.

9. The computer program product of claim 8, wherein the program code executable by the processor to iteratively and asynchronously fuse the first and second encodings comprises program code executable by the processor to correlate temporal behavior of the time series data of the second data set with representative the first vectors.

10. The computer program product of claim 8, wherein the program code executable by the processor to iteratively and asynchronously fuse the first and second encodings comprises program code executable by the processor to filter out one or more representative vectors from the encoded first data set irrelevant to patterns ascertained in the encoded second data set.

11. The computer program product of claim 8, wherein the program code executable by the processor to encode the first data set representing the time-stamped textual data feed comprises program code executable by the processor to learn semantic dependencies among words of the time-stamped textual data feed and aggregate the words into a representative vector for each input text document.

12. The computer program product of claim 7, wherein the program code executable by the processor to analyze the processed multi-modal data set further comprises program code executable by the processor to explore and interrelate information from at least two temporal sequences of different sampling frequencies.

13. A method comprising:
receiving, by a computing device, a multi-modal data set, the multi-modal data set comprising data in different formats from two or more modalities, including a first data set having a first modality and a second data set having a second modality that differs from the first modality;
separately processing the first and second data sets, including encoding the first data set into first encodings comprising one or more first vectors and encoding the second data set into encodings comprising one or more second vectors;
analyzing the processed multi-modal data set, including exploring inter-relation of information from at least two temporal sequences of a same or different sampling frequency, enabling direct incorporation of semantic information learned from the first modality of the first data feed to every time step reasoning on behaviors of the second modality of the second data feed, iteratively and asynchronously fusing the first and second encodings, the fusing comprising combining first and second vectors representing correlated temporal behavior; and
returning the fused vectors as output data.

14. The method of claim 13, wherein first input data from the first data set represents a time-stamped textual data feed and second input data from the second data set represents time series data.

15. The method of claim 14, wherein the iterative and asynchronous fusing comprises correlating temporal behavior of the time series data of the second data set with representative first vectors.

16. The method of claim 14, wherein the iterative and asynchronous fusing comprises filtering out one or more representative vectors from the encoded first data set irrelevant to patterns ascertained in the encoded second data set.

17. The method of claim 14, wherein the encoding the first data set represented by the time-stamped textual data feed comprises learning semantic dependencies among words of the time-stamped textual data feed and aggregating the words into a representative vector for each input text document.

18. The method of claim 13, wherein the analyzing the processed multi-modal data set further comprises exploring and interrelating information from at least two temporal sequences of different sampling frequencies.

19. A method comprising:
receiving, by a computing device, multi-modal data, the multi-modal data comprising data in different formats from two or more modalities, including at least a first data set and a second data set, the first data set having a first modality and the second data set having a second modality that differs from the first modality;
separately processing the first and second data sets, including encoding the first data set into first encodings comprising one or more first vectors and encoding the second data set into second encodings comprising one or more second vectors;
analyzing the processed multi-modal data, including exploring inter-relation of information from at least two temporal sequences of a same or different sampling frequency, enabling direct incorporation of semantic information learned from the first modality of the first data feed to every time step reasoning on behaviors of the second modality of the second data feed, fusing the first and second encodings, the fusing comprising combining the first and second vectors representing correlated temporal behavior between performance behavior of data in the modalities included in the multi-modal data; and returning the fused vectors encoding common behaviors.

20. The method of claim 19, wherein the first modality is textual data and the second modality is time series data, and wherein the fusing further comprises obtaining a probability mass of attention on the textual data for a current state of the time series modality.

21. The method of claim 19, wherein the analyzing the processed multi-modal data comprises employing deep learning techniques to fuse data across the modalities.

22. The method of claim 20, wherein first input data from the first data set represents a time-stamped textual data feed and second input data from the second data set represents numerical time series data, and wherein the fusing of the first and second vectors further comprises referencing the numerical time series data against the time-stamped textual data.

23. The method of claim 21, wherein the fusing the encoded vectors occurs unsupervised.

24. The method of claim 19, wherein the multi-modal data comprises one or more of medical data, climate data, computer vision data, financial data, or a combination thereof.

* * * * *